US012698757B2

(12) United States Patent
Grimsrud

(10) Patent No.: US 12,698,757 B2
(45) Date of Patent: Aug. 4, 2026

(54) METHOD AND FACILITY FOR ASSEMBLING A PLURALITY OF FLOATING WIND TURBINES

(71) Applicant: Fred. Olsen Ocean Ltd., Oslo (NO)

(72) Inventor: Geir Grimsrud, Son (NO)

(73) Assignee: Fred. Olsen Ocean Ltd., Oslo (NO)

( * ) Notice: Subject to any disclaimer, the term of this patent is extended or adjusted under 35 U.S.C. 154(b) by 35 days.

(21) Appl. No.: 18/041,927

(22) PCT Filed: Aug. 18, 2021

(86) PCT No.: PCT/EP2021/072880
§ 371 (c)(1),
(2) Date: Feb. 16, 2023

(87) PCT Pub. No.: WO2022/038165
PCT Pub. Date: Feb. 24, 2022

(65) Prior Publication Data
US 2023/0332576 A1     Oct. 19, 2023

(30) Foreign Application Priority Data

Aug. 20, 2020   (NO) .................................. 20200920

(51) Int. Cl.
*F03D 13/10*          (2016.01)
*B63B 75/00*          (2020.01)
(Continued)

(52) U.S. Cl.
CPC .............. *F03D 13/10* (2016.05); *B63B 75/00* (2020.01); *B66C 23/185* (2013.01); *F03D 13/25* (2016.05);
(Continued)

(58) Field of Classification Search
CPC .......... F03D 13/10; F03D 13/25; F03D 13/40; E02B 2017/0091; E02B 2017/0047; B66C 23/185; B63B 75/00; B63B 2035/446
See application file for complete search history.

(56) References Cited

U.S. PATENT DOCUMENTS

| | | | |
|---|---|---|---|
| 8,640,340 B2 * | 2/2014 | Foo ....................... | B63B 35/003 29/897.3 |
| 8,661,668 B2 * | 3/2014 | Vandenbulcke ........ | F03D 13/40 29/889.21 |

(Continued)

FOREIGN PATENT DOCUMENTS

| | | |
|---|---|---|
| CN | 101429928 A | 5/2009 |
| CN | 101565091 A | 10/2009 |

(Continued)

OTHER PUBLICATIONS

Pasquet, Pierre; International Search Report; PCT/EP2021/072880; Date of mailing: Dec. 3, 2021; 4 pages.

*Primary Examiner* — Frederick L Lagman
(74) *Attorney, Agent, or Firm* — Bradley Arant Boult Cummings LLP

(57) ABSTRACT

A method and an installation facility for assembling a plurality of floating wind turbines (12). The method comprising establishing an installation facility by arranging an installation vessel (1), having a crane (4), at a sheltered place, mooring a barge (2) next to said vessel (1). Further transporting a plurality of turbine blades (6), a plurality of tower sections (8) and a plurality of nacelles (10) to said installation facility, lifting of these parts onto said installation facility. Further towing a first floating wind turbine foundation (11 a) to said installation facility, erecting a tower (8a) on said first foundation (11 a) by assembling a set of said tower sections (8), installing a nacelle (10) on top of said tower (8a), installing a set of turbine blades (6) onto
(Continued)

said nacelle (10) to make a completed wind turbine (12*a*), and finally towing said first wind turbine (12*a*) away.

3 Claims, 23 Drawing Sheets

(51) Int. Cl.

| | |
|---|---|
| B66C 23/18 | (2006.01) |
| F03D 13/25 | (2016.01) |
| F03D 13/40 | (2016.01) |
| B63B 35/44 | (2006.01) |
| E02B 17/00 | (2006.01) |

(52) U.S. Cl.
CPC ........ F03D 13/40 (2016.05); B63B 2035/446 (2013.01); E02B 2017/0091 (2013.01); F05B 2230/6102 (2013.01); F05B 2240/93 (2013.01); F05B 2240/95 (2013.01)

(56) References Cited

U.S. PATENT DOCUMENTS

| | | | | |
|---|---|---|---|---|
| 9,410,528 | B2 * | 8/2016 | Westergaard | ........... F03D 13/40 |
| 9,561,839 | B2 * | 2/2017 | Ahn | ....................... E02B 17/021 |
| 10,544,015 | B1 * | 1/2020 | Van Loon | ................. B66C 1/12 |
| 10,569,977 | B1 * | 2/2020 | Hammer | ............... E02B 17/021 |
| 11,168,666 | B1 * | 11/2021 | Van Loon | ............. E02B 17/021 |
| 2005/0163616 | A1 * | 7/2005 | Mortensen | .............. F03D 13/10 |
| | | | | 416/132 B |
| 2010/0067989 | A1 * | 3/2010 | Brown | .................. B63B 35/003 |
| | | | | 405/196 |
| 2012/0027523 | A1 * | 2/2012 | Vanderbeke | ............ F03D 13/10 |
| | | | | 405/195.1 |
| 2014/0317927 | A1 | 10/2014 | Westergaard | |
| 2015/0219067 | A1 * | 8/2015 | Clymans | ............. E02B 17/0004 |
| | | | | 29/283 |
| 2019/0186465 | A1 | 6/2019 | Borøy et al. | |
| 2019/0322338 | A1 * | 10/2019 | Stroo | ..................... E02B 17/021 |
| 2020/0309097 | A1 * | 10/2020 | Hammer | ................. B63B 27/30 |

FOREIGN PATENT DOCUMENTS

| | | | | | |
|---|---|---|---|---|---|
| CN | | 102092645 | A | | 6/2011 |
| CN | | 104136358 | A | | 11/2014 |
| CN | | 104192272 | A | | 12/2014 |
| CN | | 110173397 | A | | 8/2019 |
| CN | | 106014874 | B | | 10/2019 |
| EP | | 2597027 | A1 | | 5/2013 |
| EP | | 2796709 | A1 | | 10/2014 |
| EP | | 2724021 | B1 | | 5/2019 |
| GB | | 2225365 | B | | 11/1992 |
| GB | | 2479232 | A | | 10/2011 |
| JP | | 1985208512 | A | | 9/1985 |
| JP | | 5189050 | B2 | | 4/2013 |
| KR | | 20120139931 | A | * | 12/2012 |
| KR | | 20180003214 | A | * | 1/2018 |
| KR | | 20180035379 | A | * | 4/2018 |
| WO | WO-2012039889 | | A1 | | 3/2012 |
| WO | WO-2018074923 | | A1 | | 4/2018 |
| WO | WO-2019100909 | | A1 | | 5/2019 |
| WO | WO-2019245366 | | A1 | | 12/2019 |
| WO | WO-2020053015 | | A1 | | 3/2020 |

* cited by examiner

METHOD AND FACILITY FOR ASSEMBLING A PLURALITY OF FLOATING WIND TURBINES

TECHNICAL FIELD

The present invention relates to a method and an arrangement to assemble wind turbines on floating foundations, as defined in the appended claims.

BACKGROUND ART

In prior art wind turbines are either assembled individually at the installation site or assembled at the dock and transported to the installation site. In the latter case, several wind turbines may be transported to the installation site by the same vessel.

An example of the first type of technology is shown in CN101429928B, where a barge is used to transport the wind turbine and a crane vessel lifts the turbine from the barge and onto a foundation.

An example of the latter type is shown in WO2019100909A1, where a plurality of already assembled turbines are arranged in a rack on a vessel and transported to the installation sites where they are lifted into the sea.

WO2019245366 describes an installation facility and a method where a wind turbine is assembled at the installation site. This requires vessels that are designed to be used at open sea and the installation can only take place during calm weather. These factors will increase the costs and shorten the weather window.

EP2597027 also describes an installation facility intended for assembly of a wind turbine at the installation site. As the wind turbine is a floating turbine, the installation vessel is equipped with a gripping section that attaches to the floating foundation.

Other prior art examples are shown in GB2225365B, CN101565091B, CN106014874B, JP1985208512A, CN110173397A, GB2479232A, JP5189050B2, CN102092645, WO2018074923, US2014317927, US2019186465, EP2724021 and CN104192272A.

The individual assembly on site method is a slow and laborious process that is not suitable for installation of a plurality of wind turbines. The barge has to travel back to the port to pick up the next turbine. In the meantime, the crane vessel will be idle waiting for the barge to return.

The transporting of a plurality of already assembled turbines to the installation site, or area, is more efficient, but it requires a special purpose vessel that is capable of transporting the assembled wind turbines.

As the need for renewable energy increases, ocean-based wind turbines have become an increasingly viable source. Building wind turbines one by one is therefore not viable these days. This is too inefficient and expensive. There is therefore a need of a new method and arrangement that is both efficient and does not require purpose-built vessels, but can be performed using standard barges, transport vessels and crane vessels.

SUMMARY OF INVENTION

The main object of the present invention is to provide a method and an arrangement that allows for a continuous serial production of completed floating wind turbines.

Another object is to reduce costs and build time.

With the novel method of the present invention, serial production of wind turbines can take place without substantial waiting time for any of the vessels involved.

BRIEF DESCRIPTION OF DRAWINGS

The invention will now be described in connection with an illustrative exemplary embodiment shown in the accompanying drawings, in which.

DETAILED DESCRIPTION OF THE INVENTION

The exemplary embodiment of the invention is illustrated as a sequence in FIGS. 1-23. As a first step of the method, an installation vessel 1 and a barge 2 are brought to sheltered area, such as a fjord or a bay with adequate depth.

Figure 1:
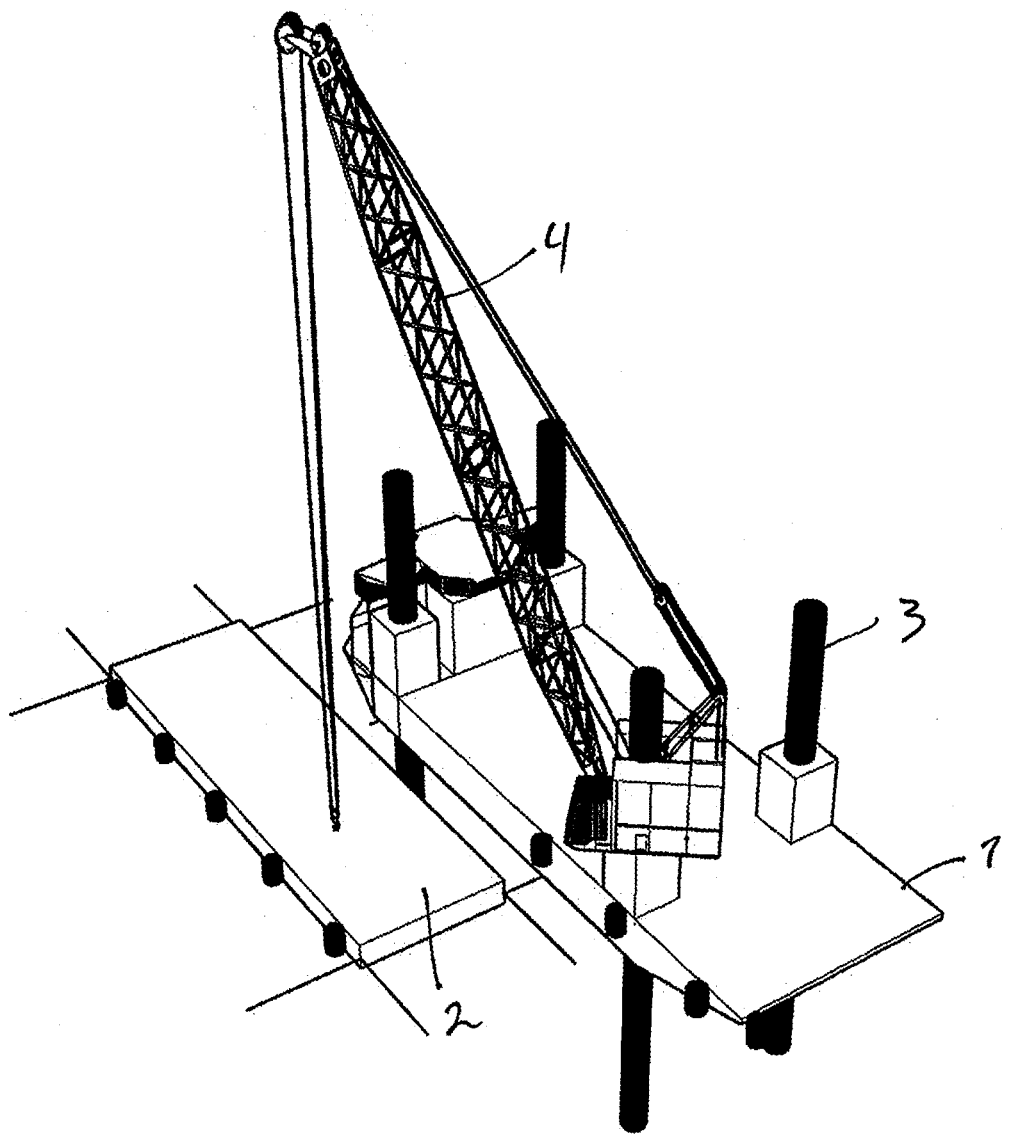
FIG. 1 shows an installation vessel and a barge to be used as a permanent installation during the assembly of wind turbines.

The barge 2 is moored using anchors (not shown) and the installation vessel 1 is positioned next to the barge 2, as shown in FIG. 1. The installation vessel 1 is preferably of the jack-up type, having jack-up legs 3. The jack-up legs 3 are lowered to the sea floor to support the vessel 1 in a fixed position above the water surface.

The installation vessel is equipped with a crane 4 with sufficient lifting capacity to lift the heavy parts of the wind turbines.

Figure 2:
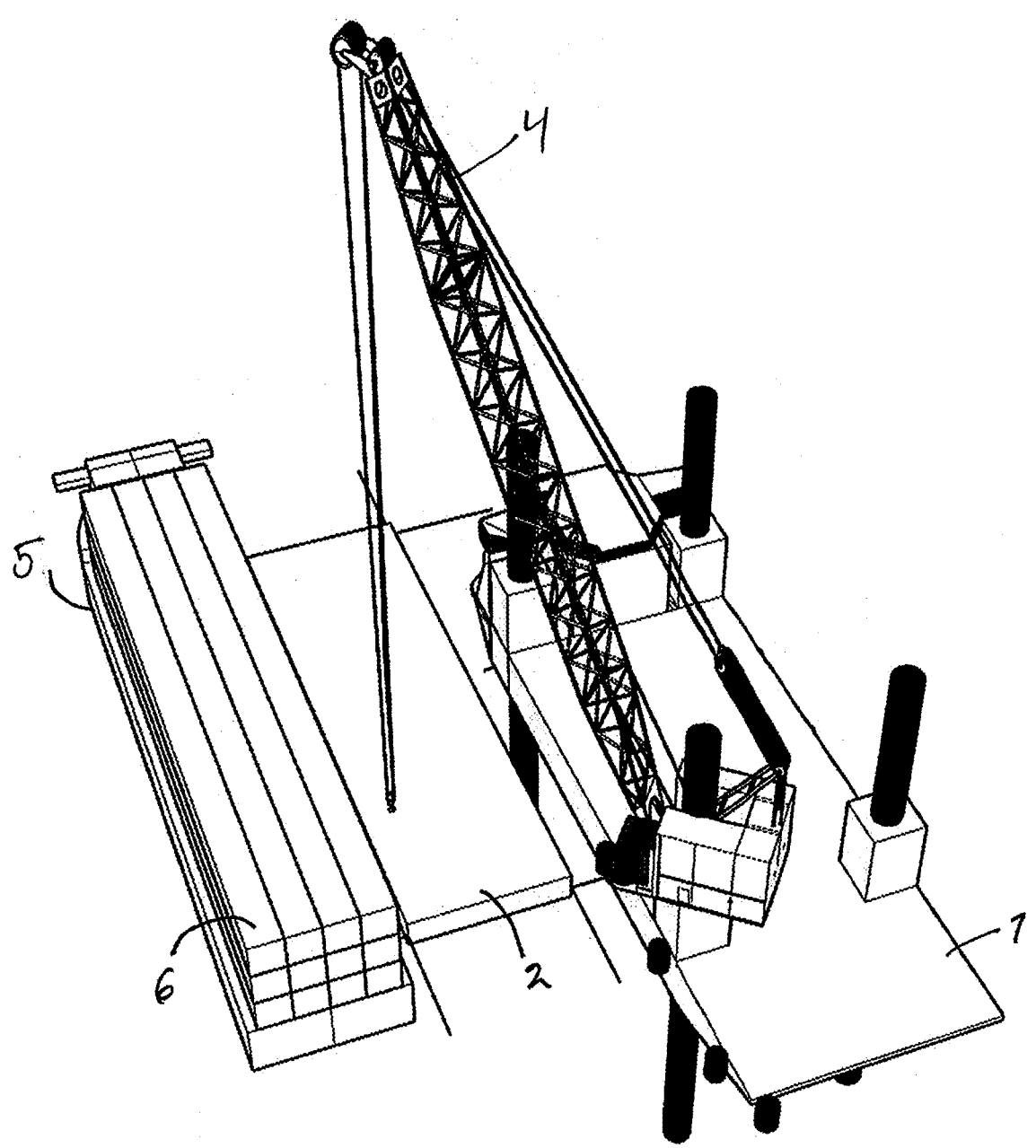
FIG. 2 shows a first feeder vessel moored at the installation.

With the installation vessel 1 and barge 2 in fixed positions, a first feeder vessel 5 arrives with a stack of turbine blades 6. The feeder vessel 5 is brought next to the barge 2 and moored to this at the opposite side of the installation vessel 1, as shown in FIG. 2. The blades 6 are contained within frames, cages or boxes, making it possible to stack them on the deck of the feeder vessel 5. In the following the frames, cages or boxes will be referred to as cages.

Figure 3:
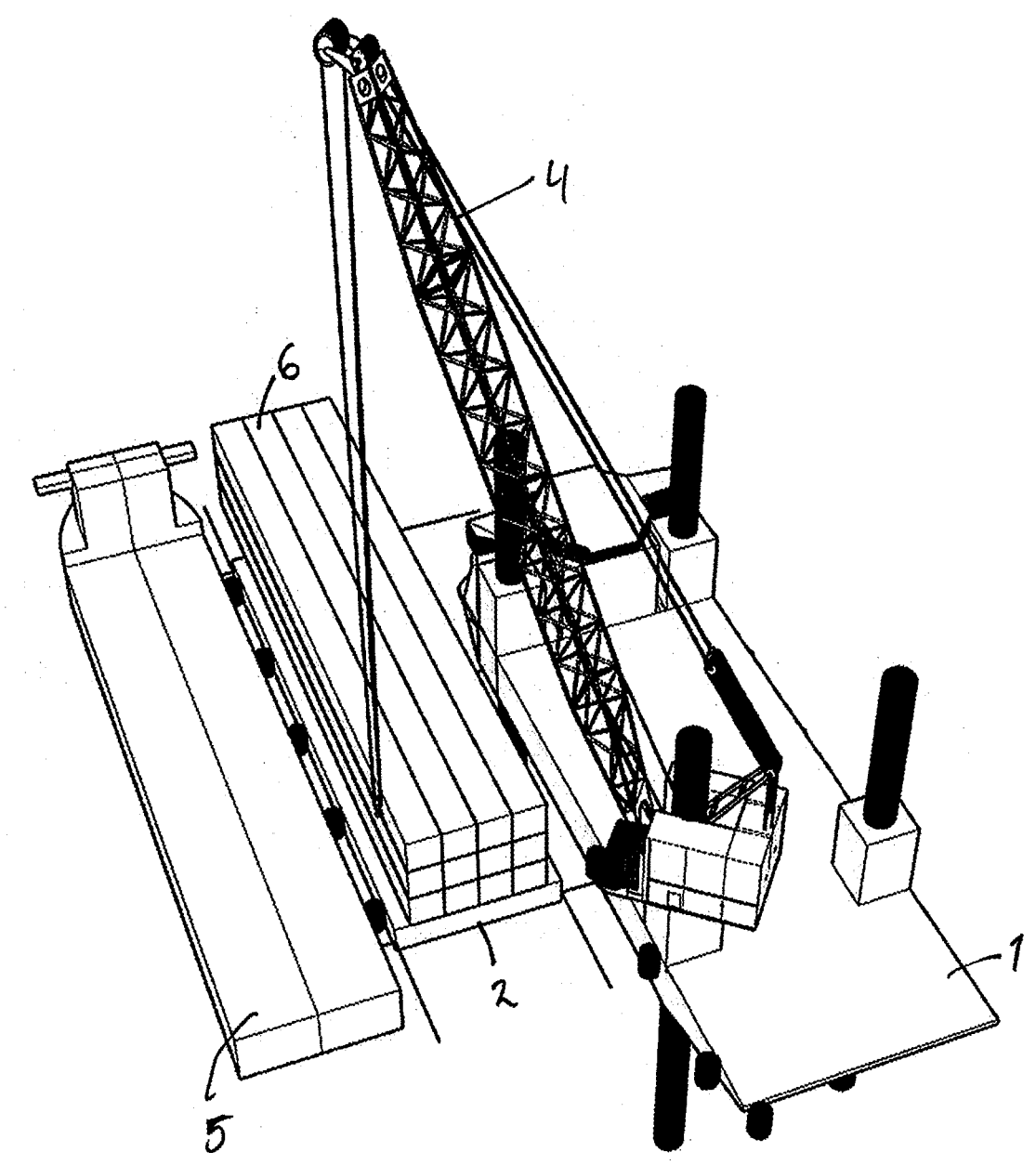
FIG. 3 shows wind turbine blades having been loaded from the first feeder vessel to the barge.

Then the crane 4 lifts the blades 6 off the feeder vessel 5 and onto the barge 2, as shown in FIG. 3. The barge may not have sufficient space for all blades. In that case some of the blades will remain on board the feeder vessel until a sufficient number of blades to free up space have been assembled to a wind turbine. As soon as all blades have been loaded off the first feeder vessel, the feeder vessel 5 is free to return to the port and pick up new items.

Figure 4:
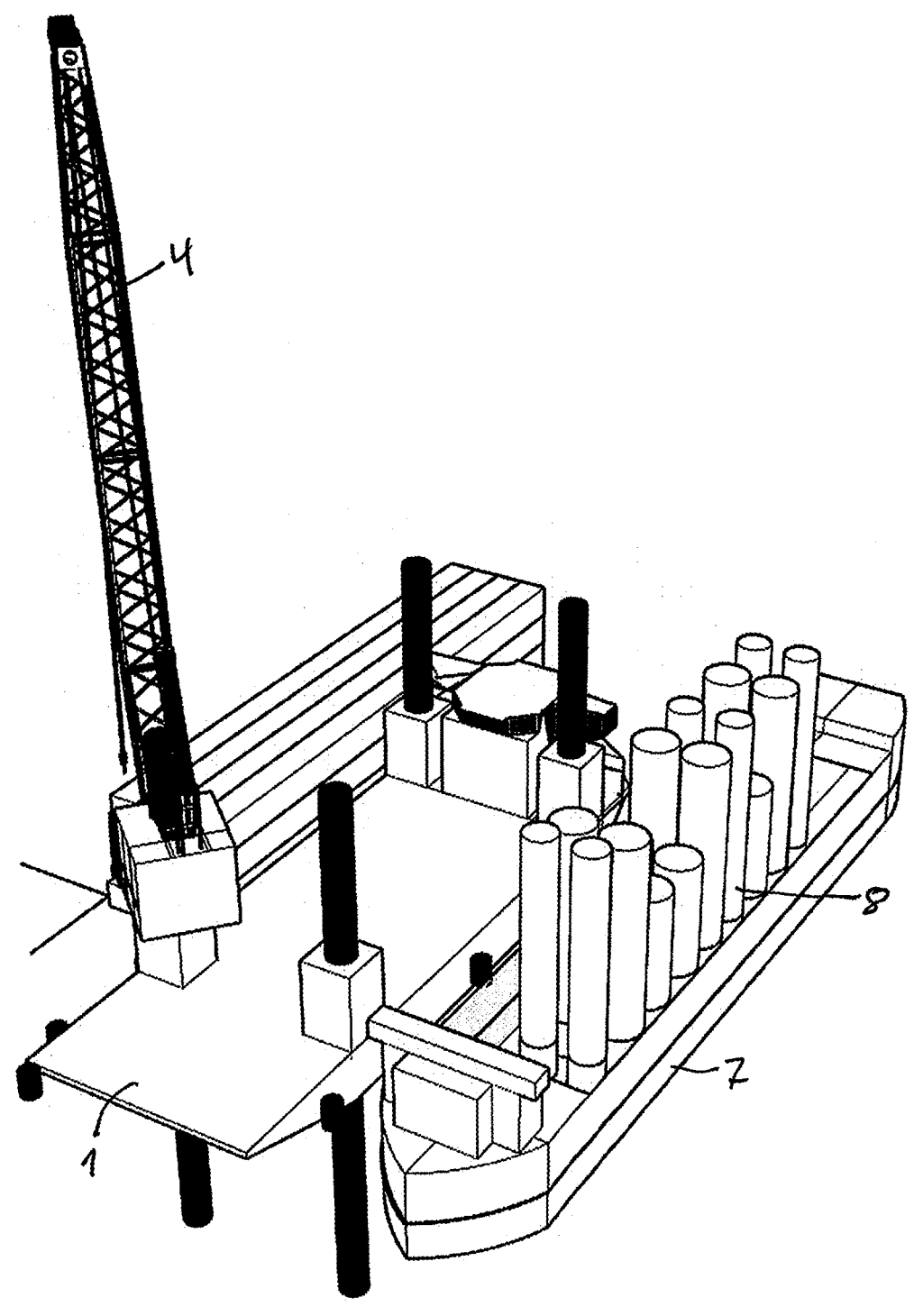
FIG. 4 shows a second heavy lift feeder vessel having arrived with tower sections.

Next a second heavy lift feeder vessel 7 arrives with tower sections 8. The heavy lift feeder vessel is brought next to the installation vessel 1 and moored to this at the opposite side of the barge 2, as shown in FIG. 4.

Figure 5:
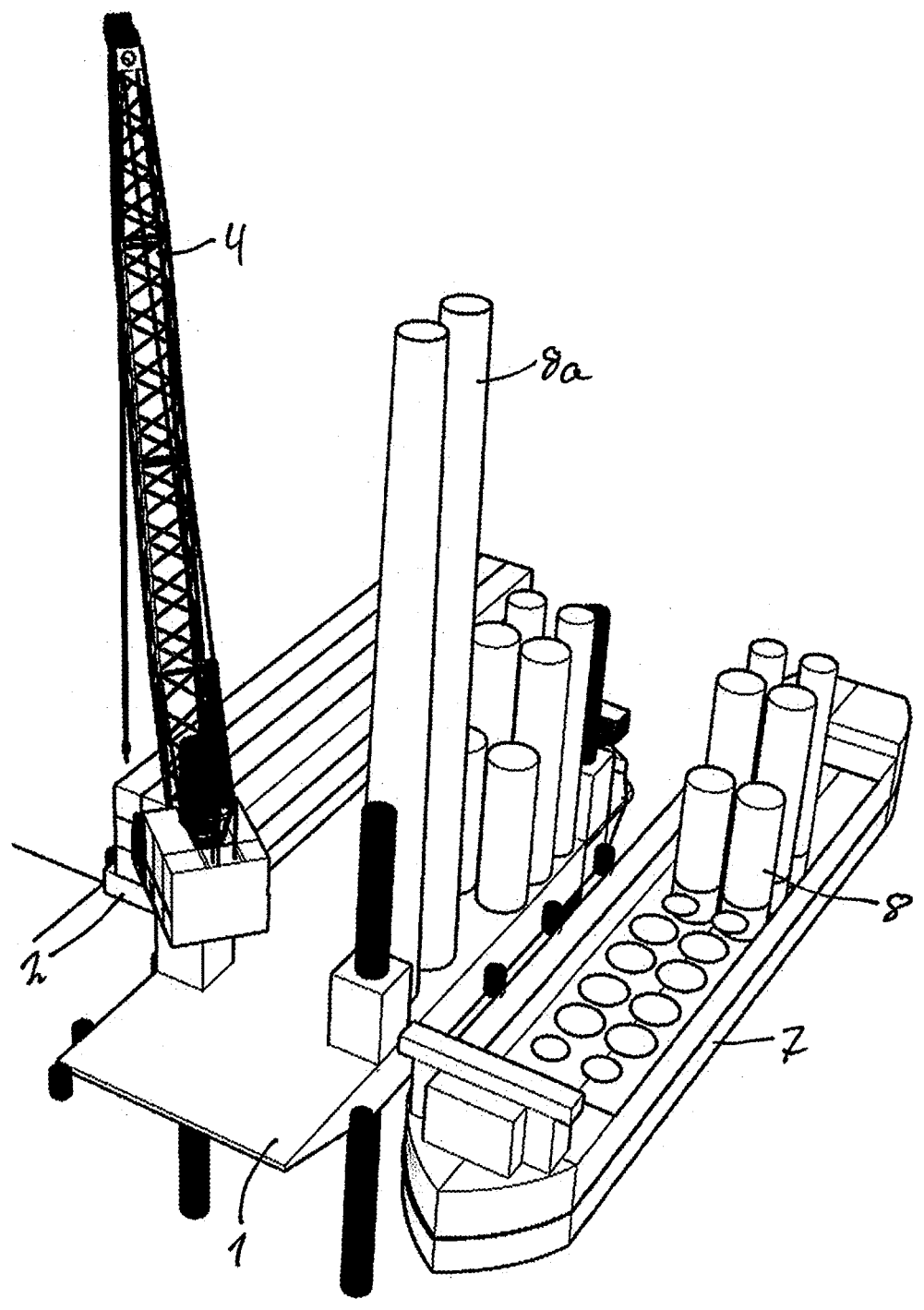
FIG. 5 shows some of the tower section having been lifted from the second feeder vessel onto the installation vessel.
Figure 6:
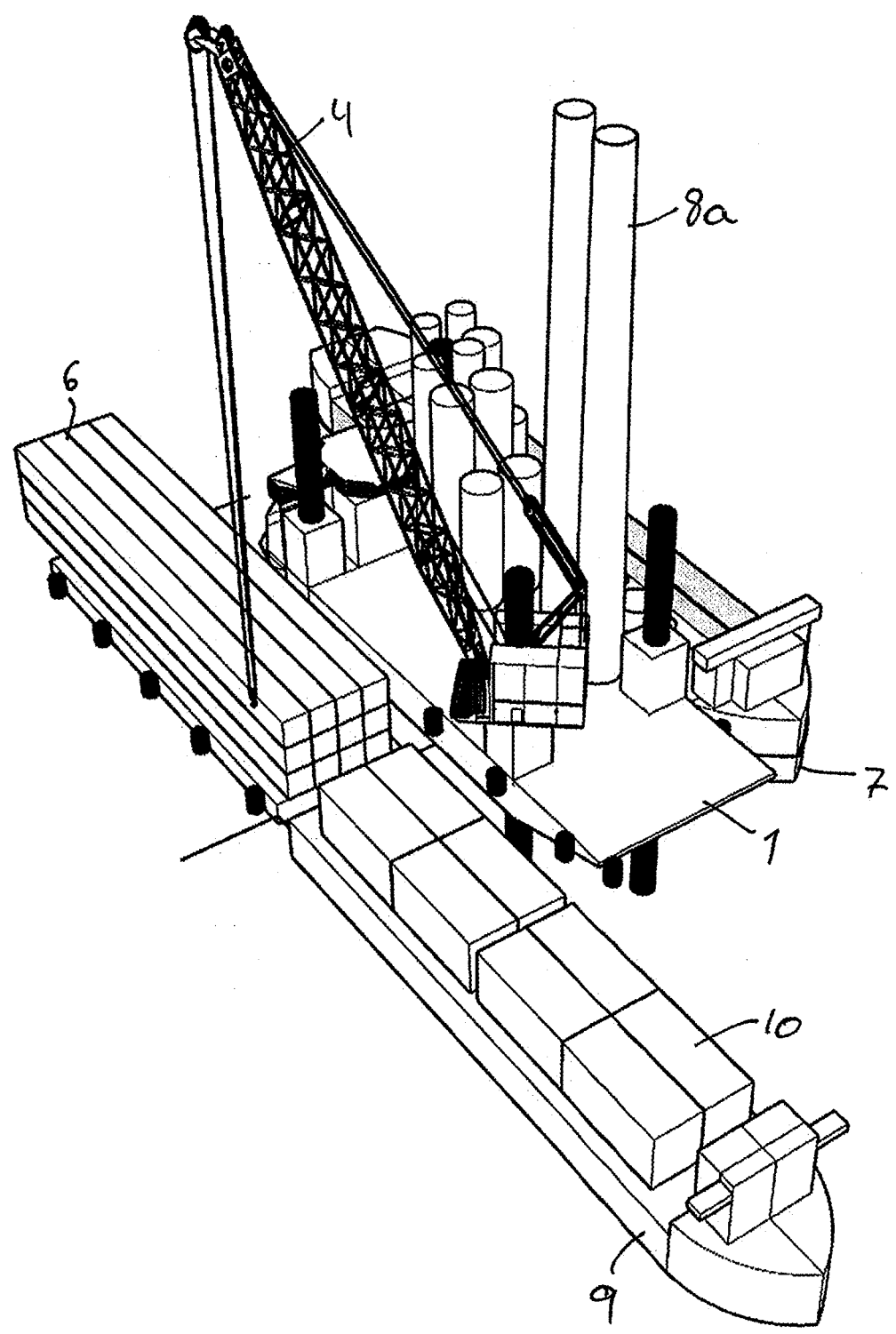
FIG. 6 shows a third feeder vessel having arrived with nacelles.

Then the tower sections 8 are lifted off the heavy lift feeder vessel 7 and onto the deck of the installation vessel 1, as shown in FIG. 5. The tower sections 8 can be of different lengths, according to their position in the assembled tower. As the installation vessel 1 may not have enough space to accommodate all tower parts 8, some parts 8 may remain on the second heavy duty feeder vessel 7. During the transfer of the tower sections 8, a couple of towers 8a (this can be from one to all towers 8a depending on the space available) are erected in assembled state on the deck of the installation vessel.

In the next step a third feeder vessel 9 arrives with a load of nacelles 10. This can be done while the second heavy lift feeder vessel 7 is still docked next to the installation vessel 1. As can be seen from FIG. 6, the barge 2 is arranged somewhat displaced along the installation vessel 1, leaving a portion of the side of the installation vessel 1 clear for the third feeder vessel 9 to dock and moor next to the installation vessel 1.

Figure 7:
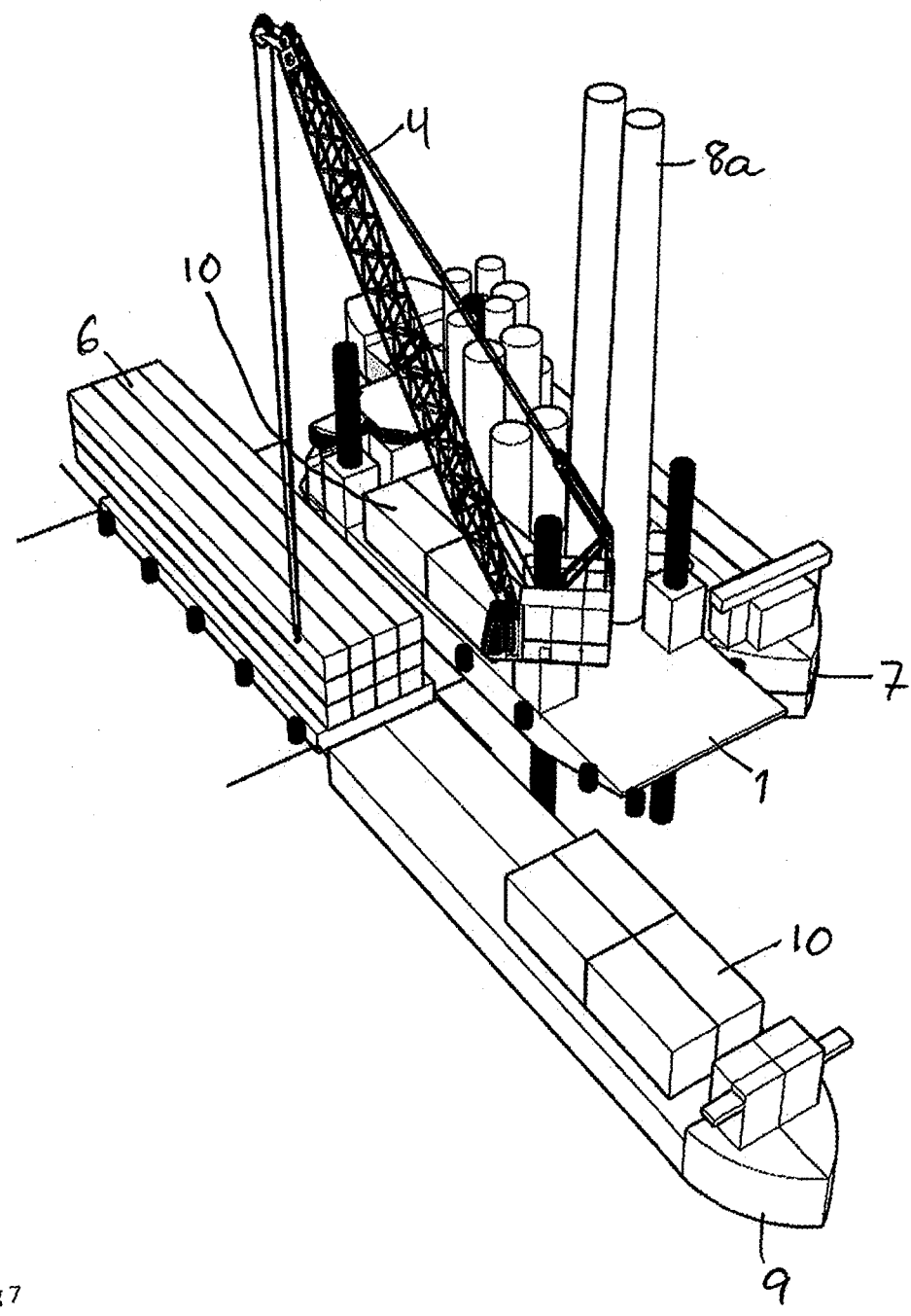
FIG. 7 shows nacelles being unloaded.
Figure 8:
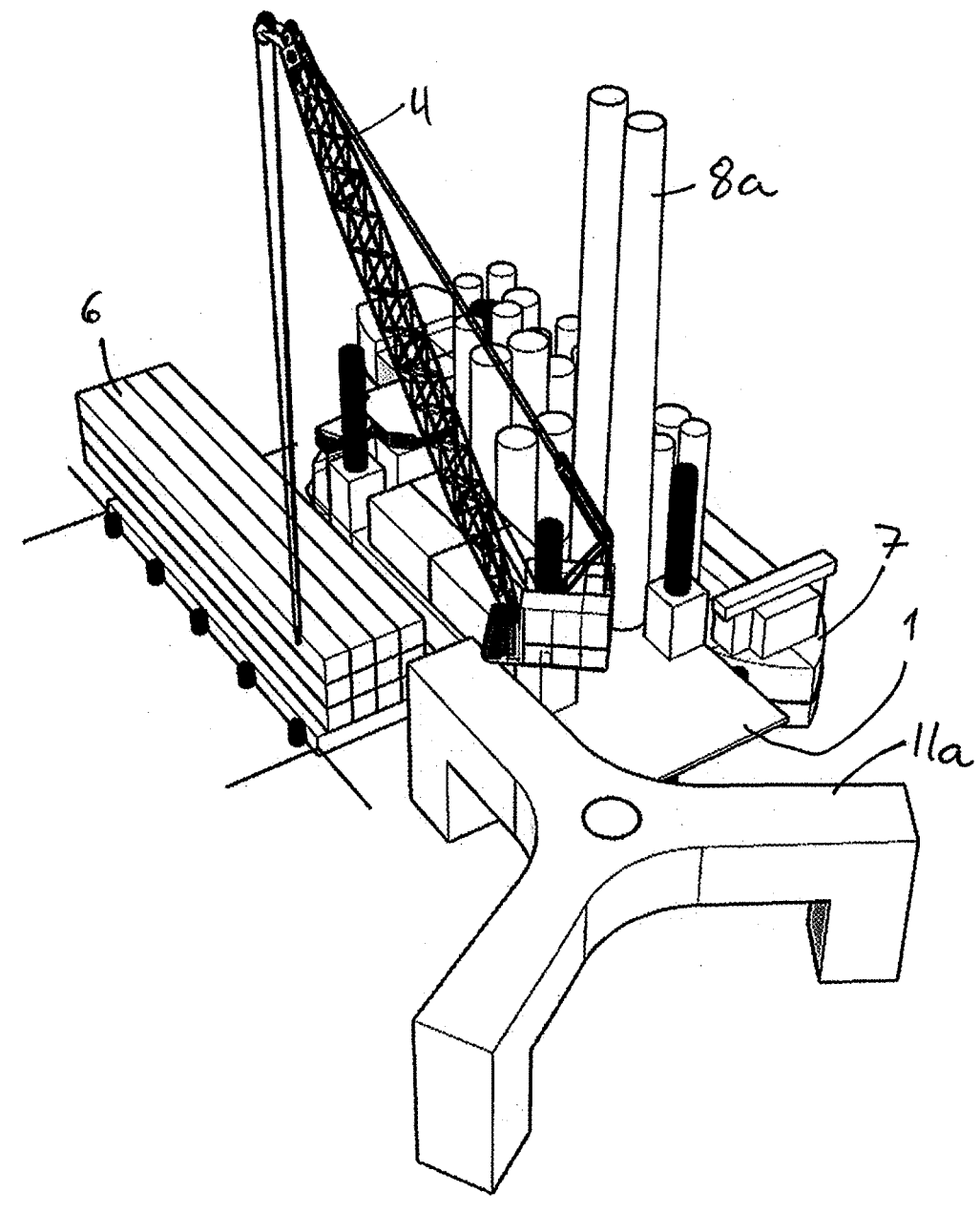
FIG. 8 shows a first foundation having arrived at the installation.

As shown in FIG. 7, the nacelles 10 now lifted off the third feeder vessel 9 and onto the deck of the installation vessel 1. As for the first and second feeder vessels, there may not be sufficient room for all nacelles on the installation vessel 1 (or the barge 2). In that case some of the nacelles will remain on board the feeder vessel until sufficient space has been freed up on the installation vessel. The third feeder vessel is then free to leave to pick up further items.

With all parts of the wind turbine now arranged either on the installation vessel 1, the barge 2 and possibly the second feeder vessel 7, a first floating foundation 11a is brought next to the installation vessel 1. This is preferably done by two tugboats (not shown). Winches (not shown) on board the installation vessel 1 are used to pull the foundation 11 close to the installation vessel 1 and keep it in position.

Figure 9:
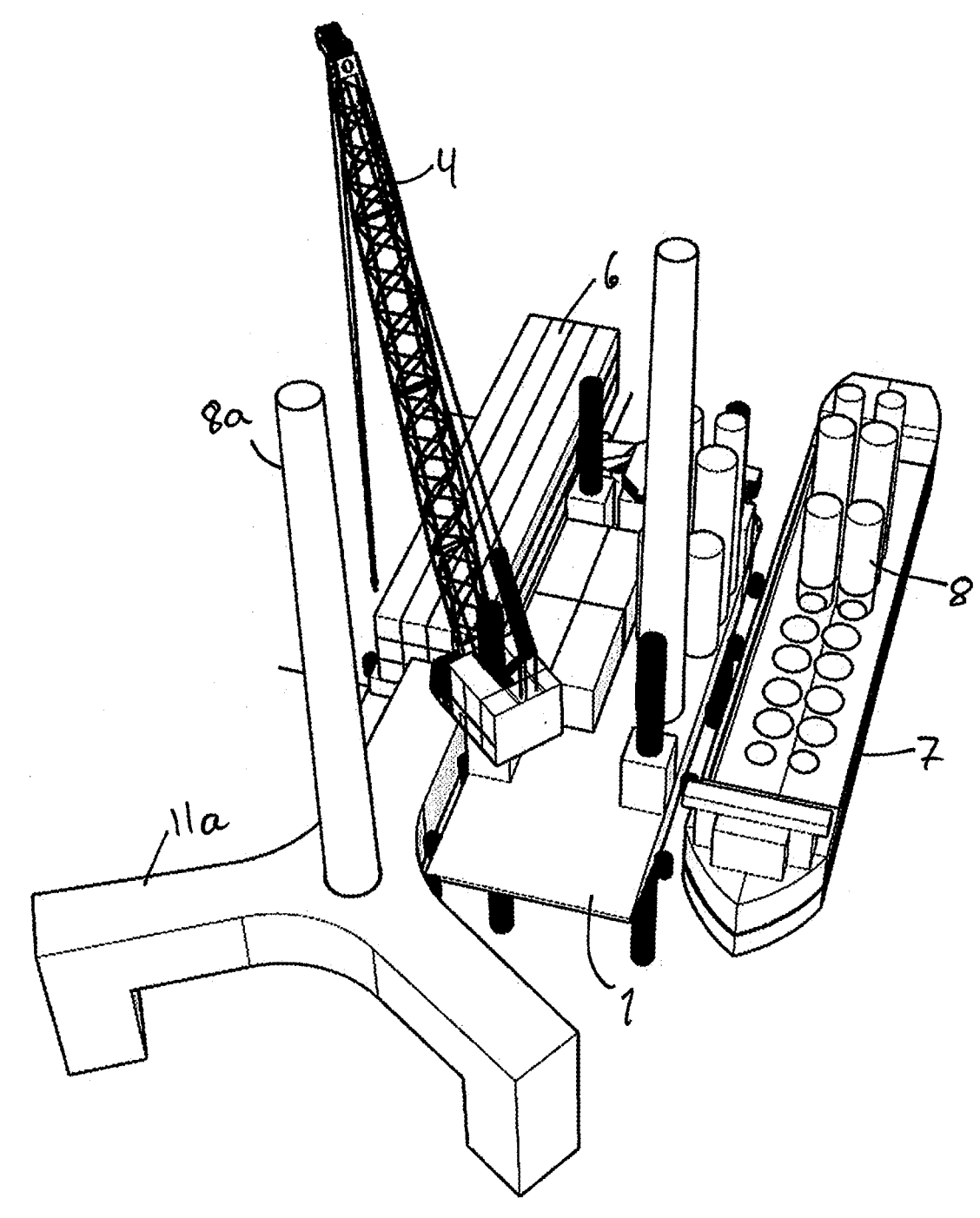
FIG. 9 shows a tower being erected on the first foundation.

Now the assembly of the wind turbines is ready to commence. One of the already assembled towers 8a is lifted by the crane 4 and onto the foundation 11a where it is secured, as shown in FIG. 9.

Figure 10:
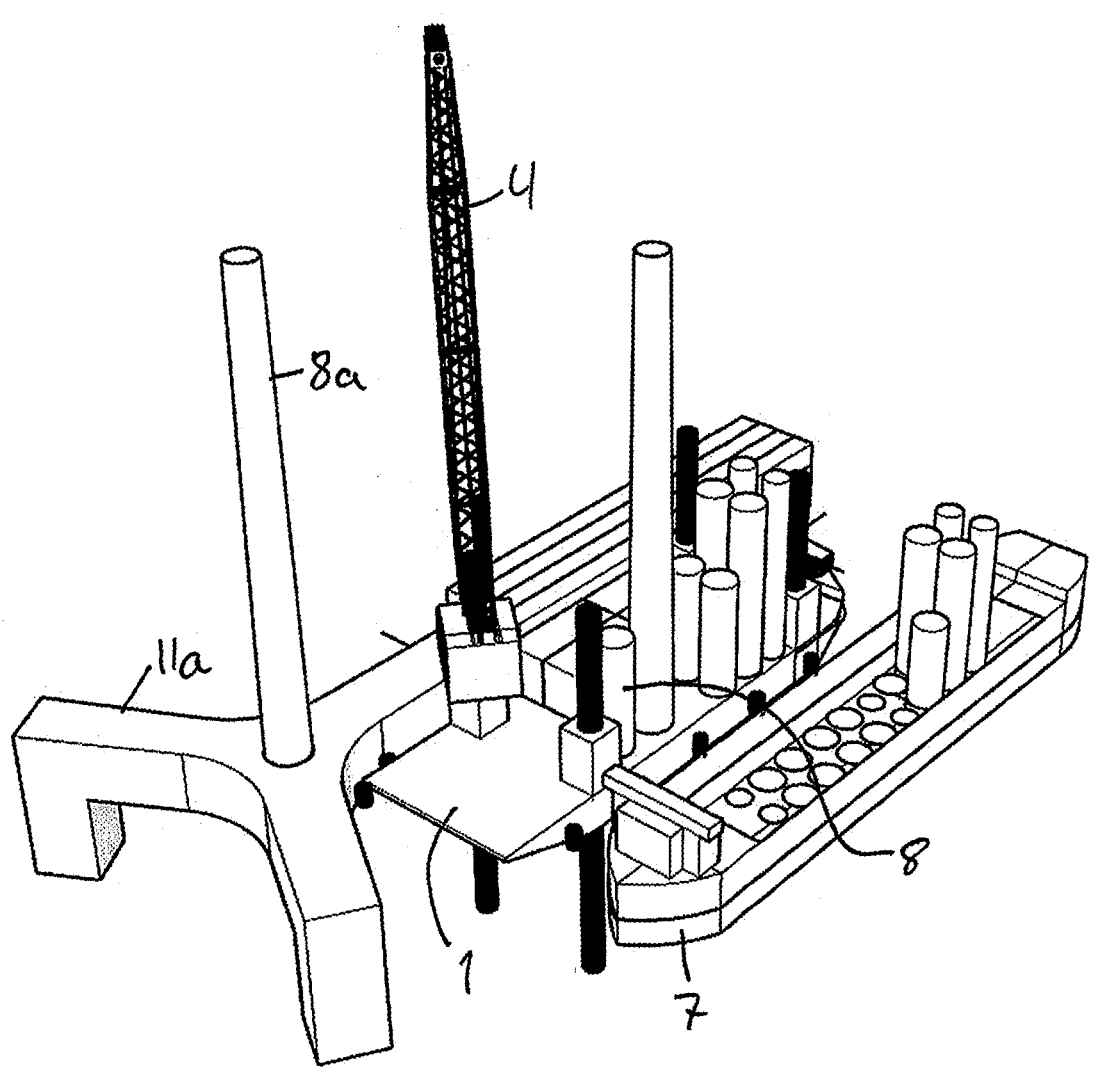
FIG. 10 shows further unloading of tower section.

As the space where the first tower 8a was arranged on the installation vessel 1 is freed, a further tower section 8 can be lifted from the second feeder vessel 7 to the free space on the installation vessel 1, as shown in FIG. 10.

Figure 11:
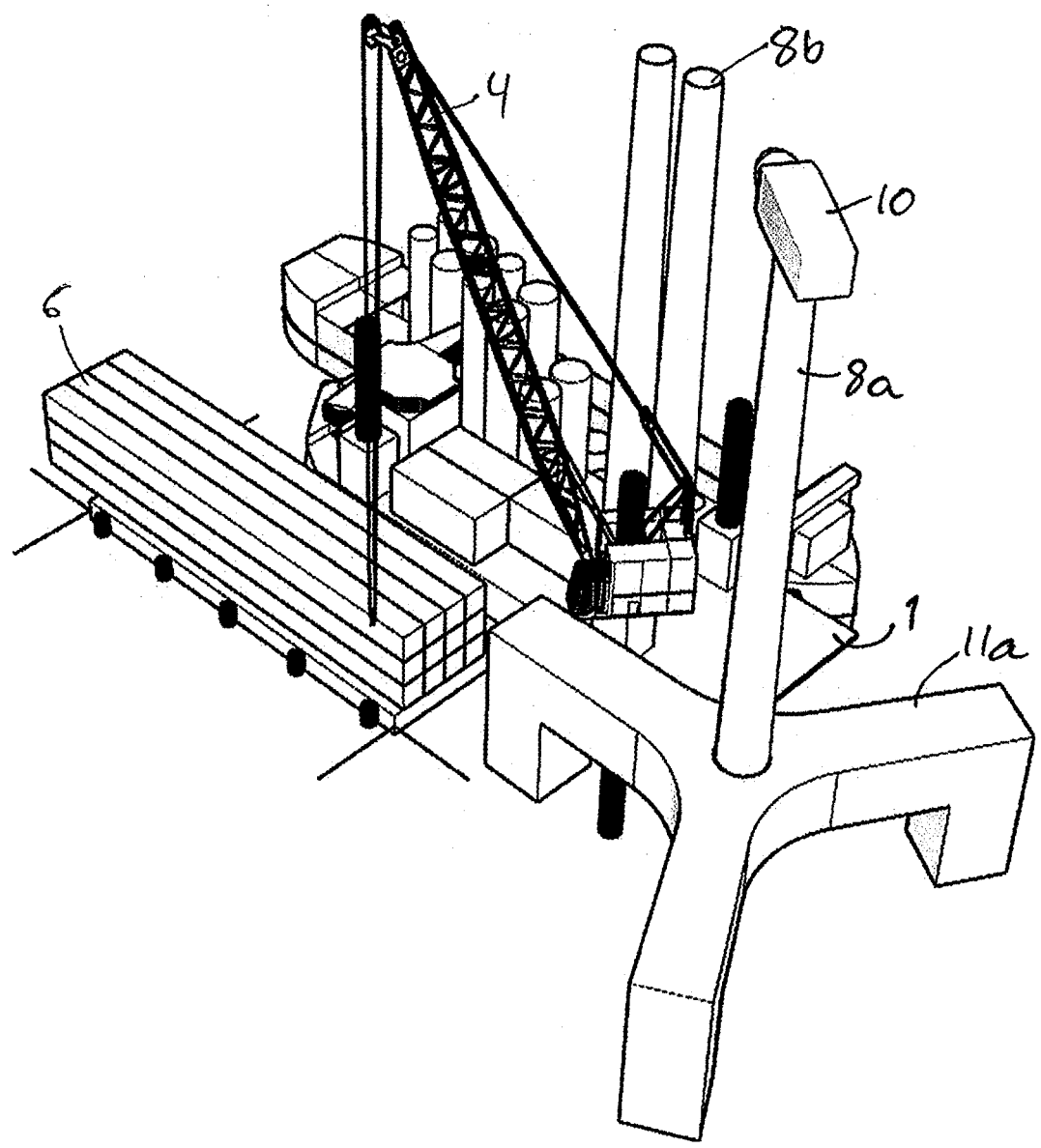
FIG. 11 shows a nacelle having been installed on the first wind turbine.
Figure 12:
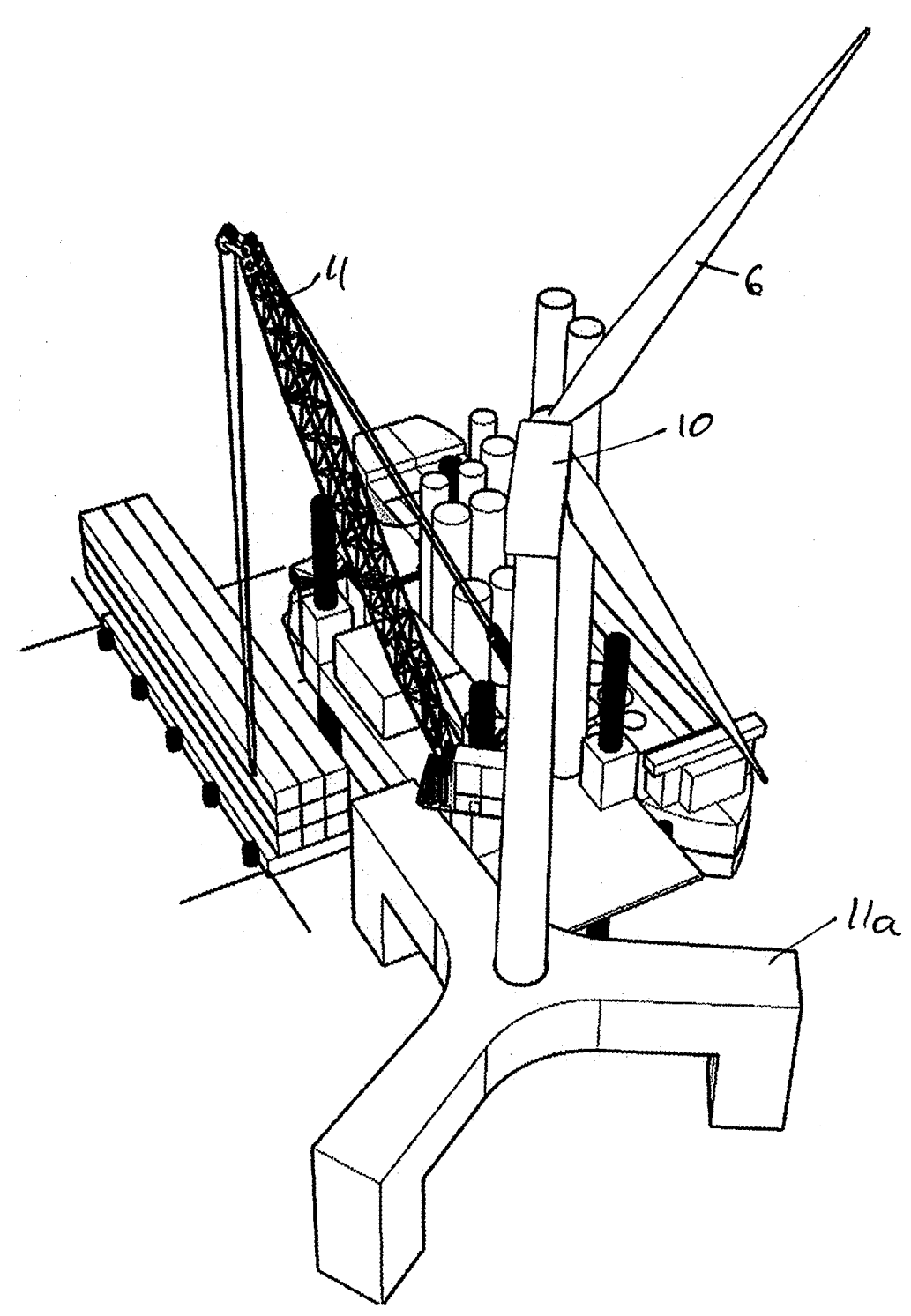
FIG. 12 shows blades being installed on the first wind turbine.

Now a nacelle 10 is installed on top of the tower 8a, as shown in FIG. 11. The crane 4 may continue to assemble tower sections into 8 a new tower 8b, as long as it is not engaged in the assembly operation of the wind turbine on the foundation 11a, as also shown in FIG. 11.

In the next step a blade gripper (not shown) is attached to the hook of the crane 4. Then a first blade 6 is lifted out of its cage directly from the barge 2 and attached to the nacelle 10. The same procedure is repeated for the next two blades 6.

When the crane is idle, it may be used to lift the empty cages in which the blades 6 were stored onto a free space on the deck of the installation vessel 1.

After testing the function of the wind turbine, i.e. rotating the nacelle, the first foundation 11a with the assembled turbine 12a can be towed away and to the installation site or to a temporary storage area, awaiting installation.

Figure 13:
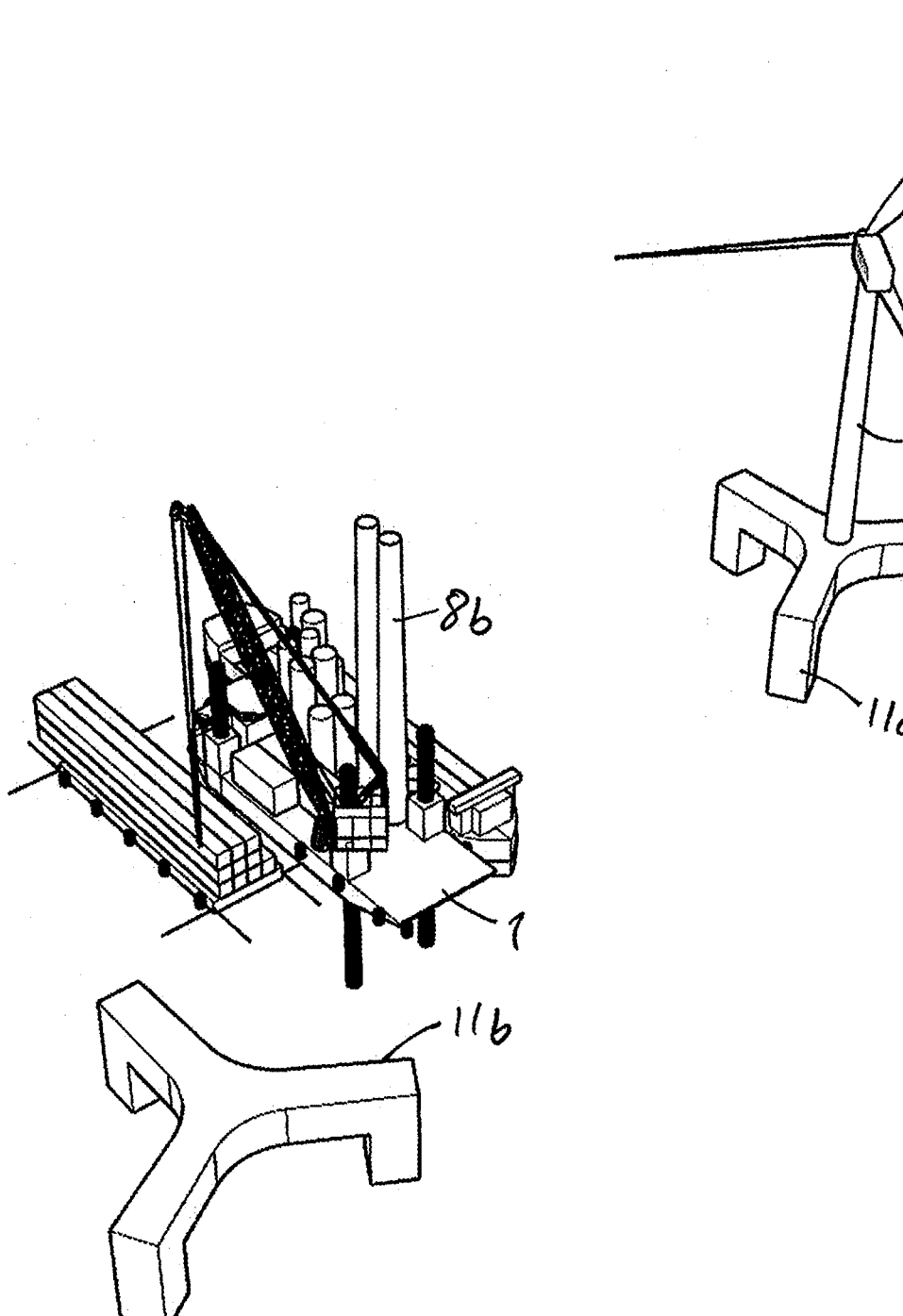
FIG. 13 shows the first wind turbine being towed away and a second foundation arriving.

A new foundation 11b can now be towed into the position where the first foundation 11a used to be, as shown in FIG. 13.

Figure 14:
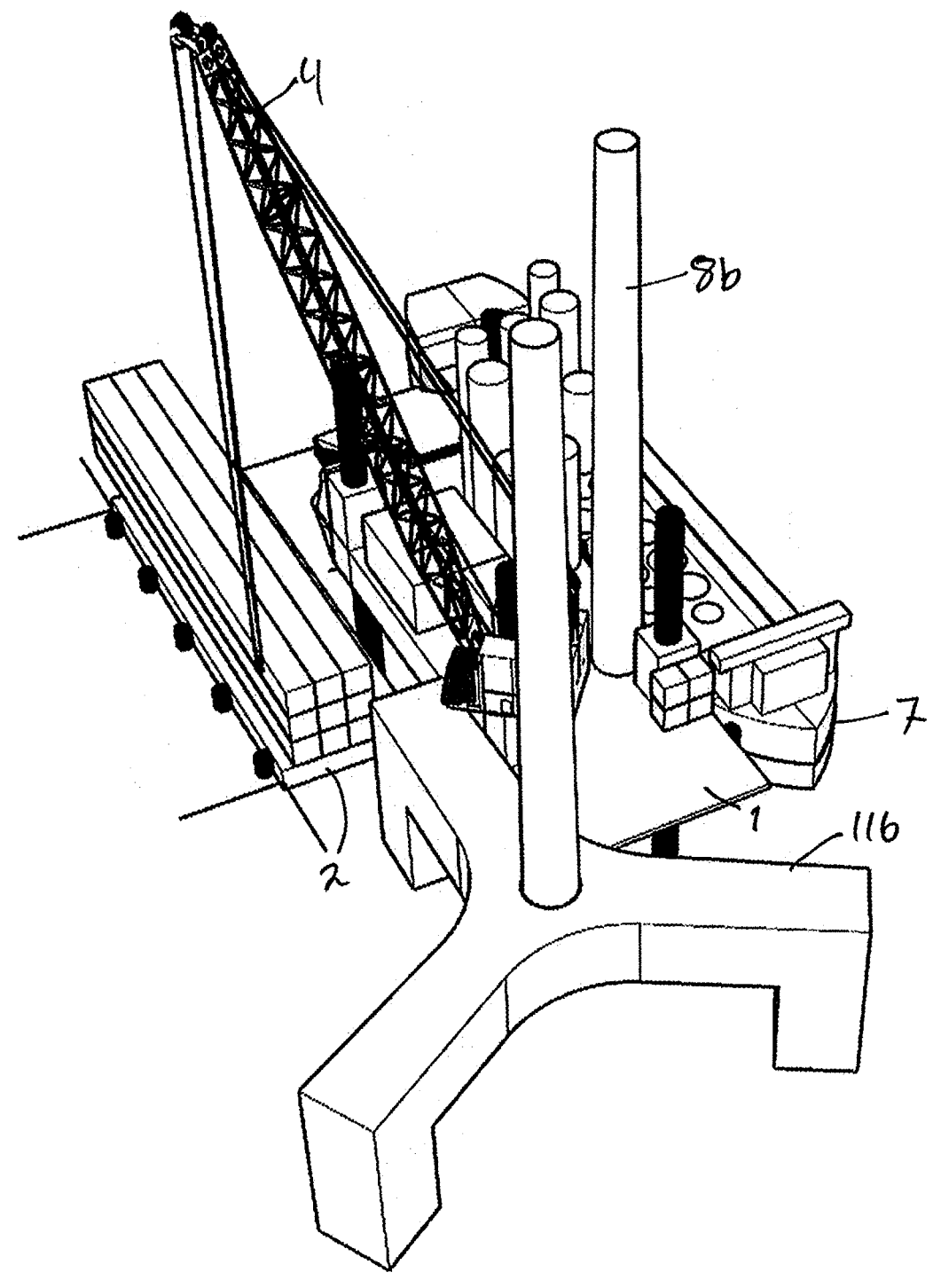
FIG. 14 shows a tower having been erected on the second foundation.
Figure 15:
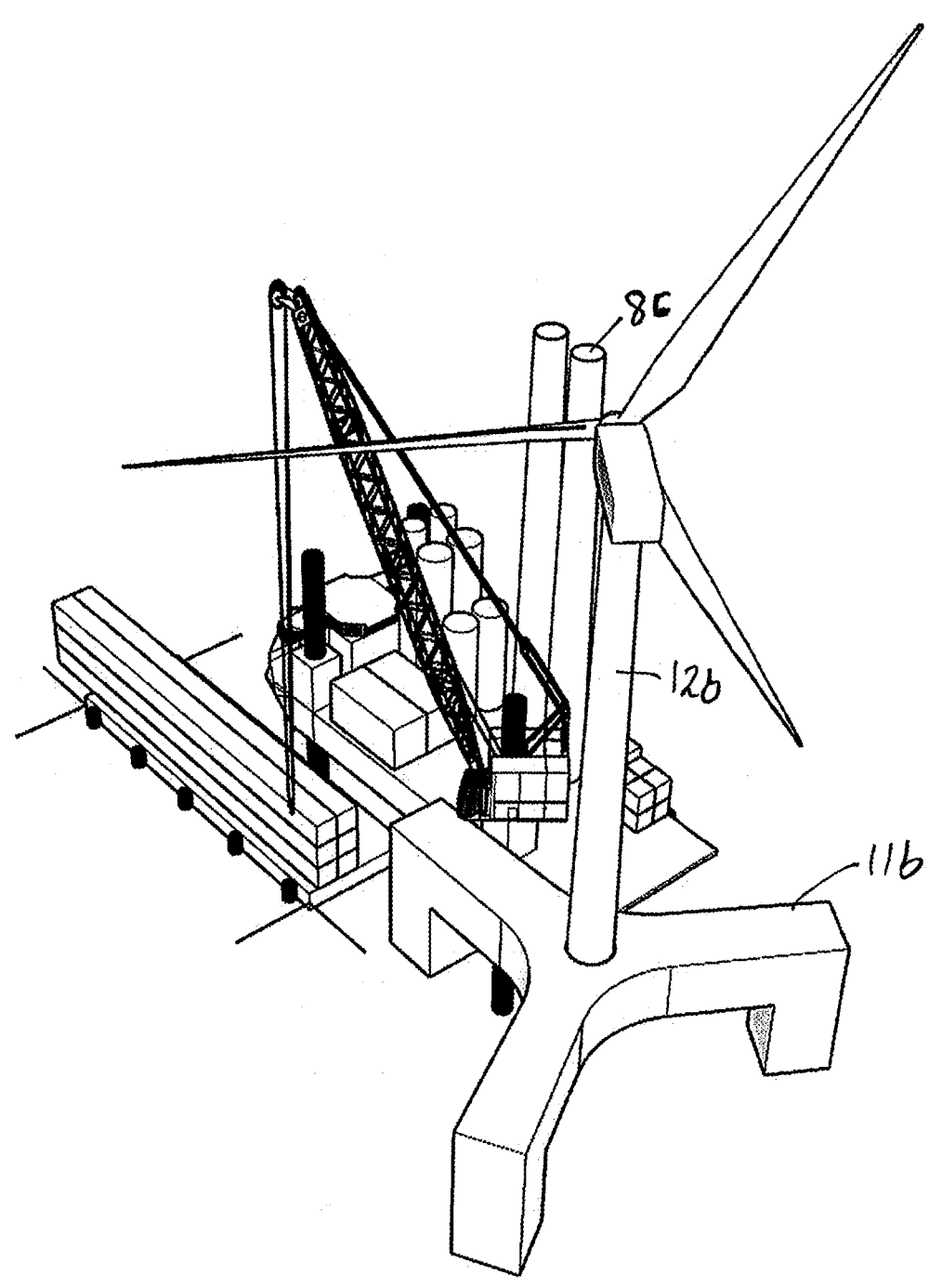
FIG. 15 shows the second wind turbine having been completed.

In FIG. 14 the second tower 8b has been lifted from the installation vessel 1 onto and fixed to the second foundation 11b. During idle periods after the tower 8b has been removed from the installation vessel 1, the remaining tower parts 8 are lifted from the second feeder vessel 7 and assembled to a third tower 8c on the installation vessel 1. When the last tower section 8 has been removed from the feeder vessel 7, the feeder vessel 7 is free to leave and return to port to pick up new items, see FIG. 15.

The second turbine 12b is now completely assembled according to the same procedure as for the first turbine 12a, and after testing the turbine 12b will be towed to the installation site or to an intermediate storage area.

Figure 16:
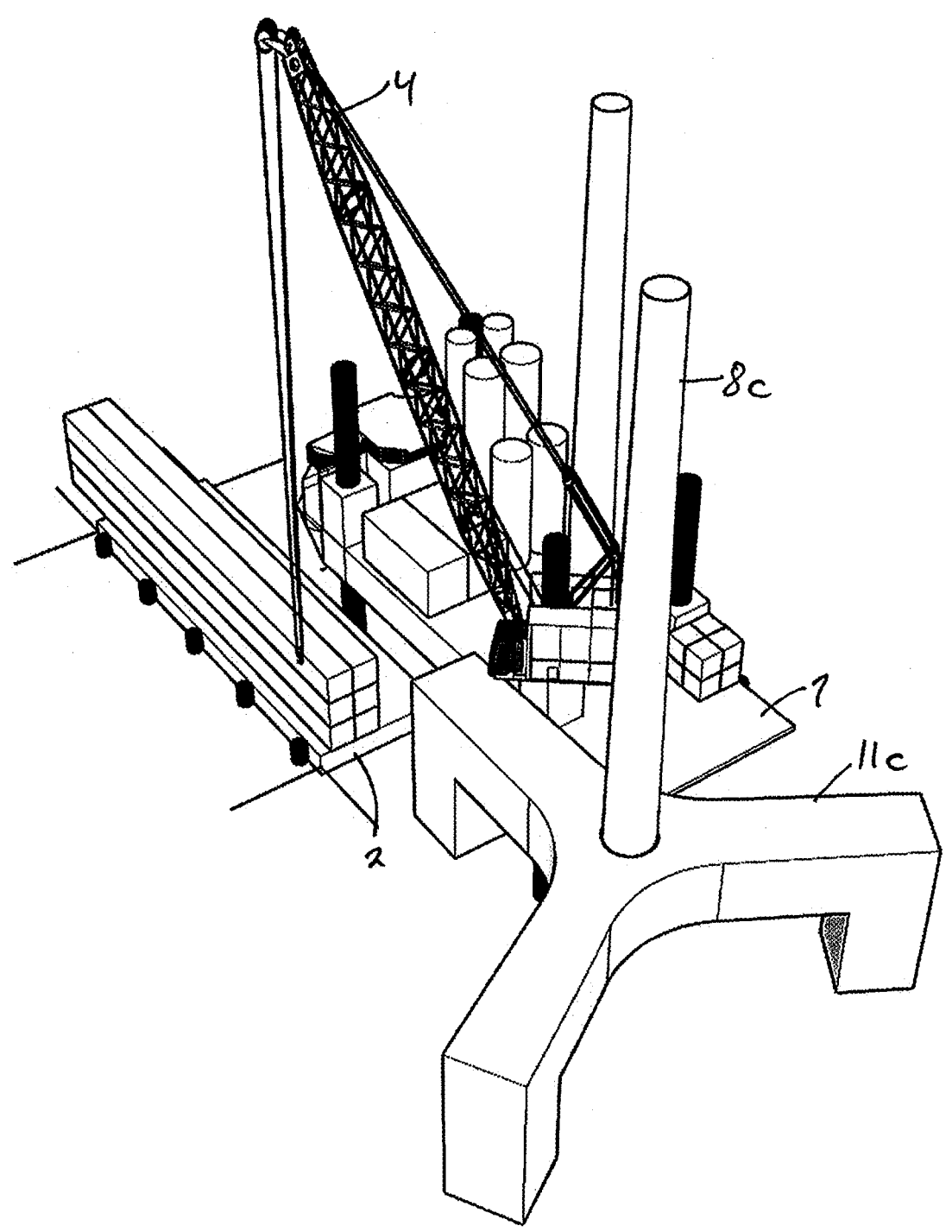
FIG. 16 shows a tower having been erected on a third foundation.
Figure 17:
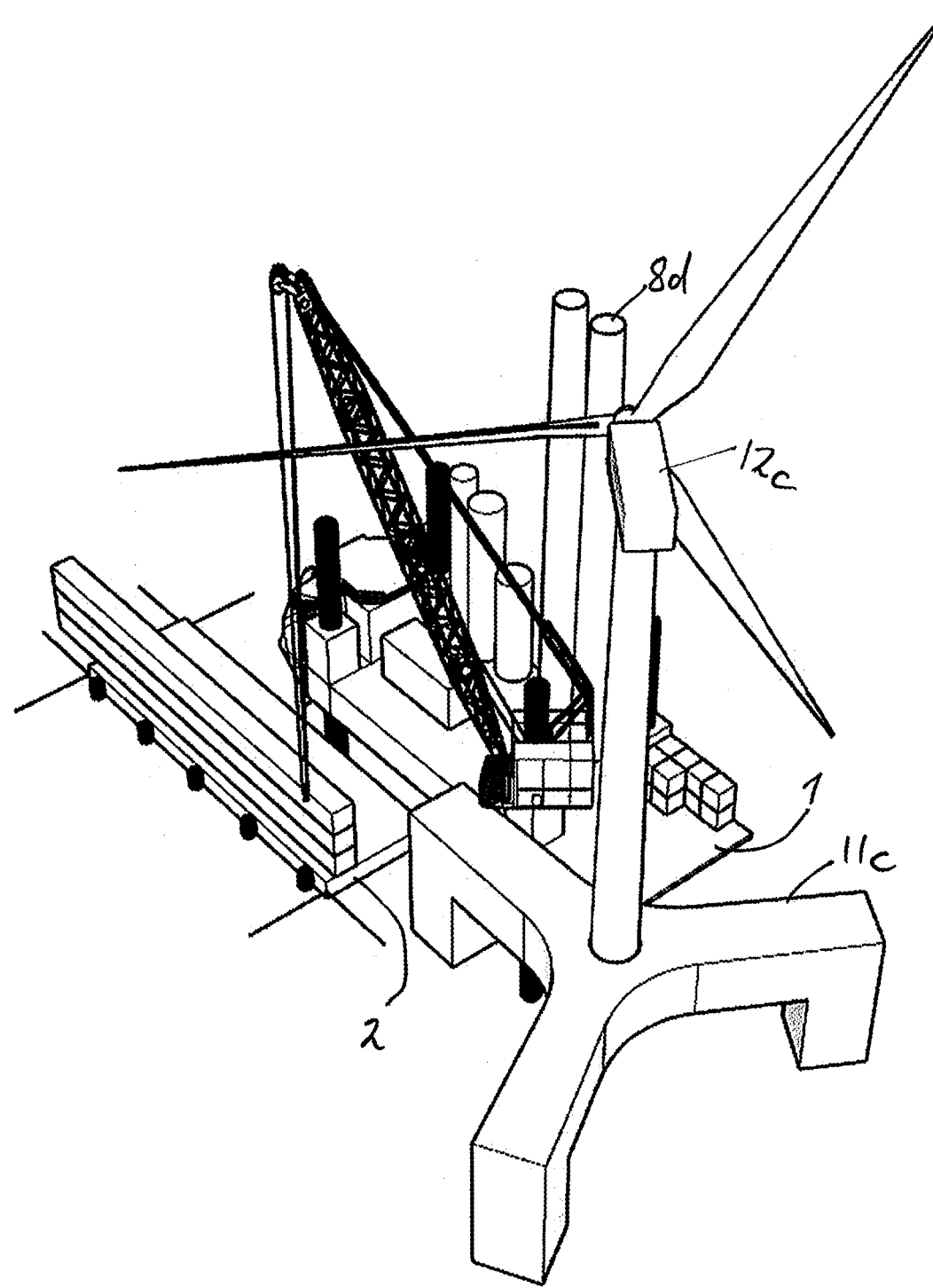
FIG. 17 shows the third wind turbine having been completed.

A third foundation 11c is towed to a position next to the installation vessel 7 and the third tower 8c is fixed thereon, as shown in FIG. 16. Then a nacelle 10 and blades 6 are installed in the same way as explained above until the third turbine 12c is complete, as shown in FIG. 17.

During idle periods, the crane 4 is used to assemble yet another tower 8d from tower sections 8 that have already been placed on the deck of the installation vessel 1.

Figure 18:
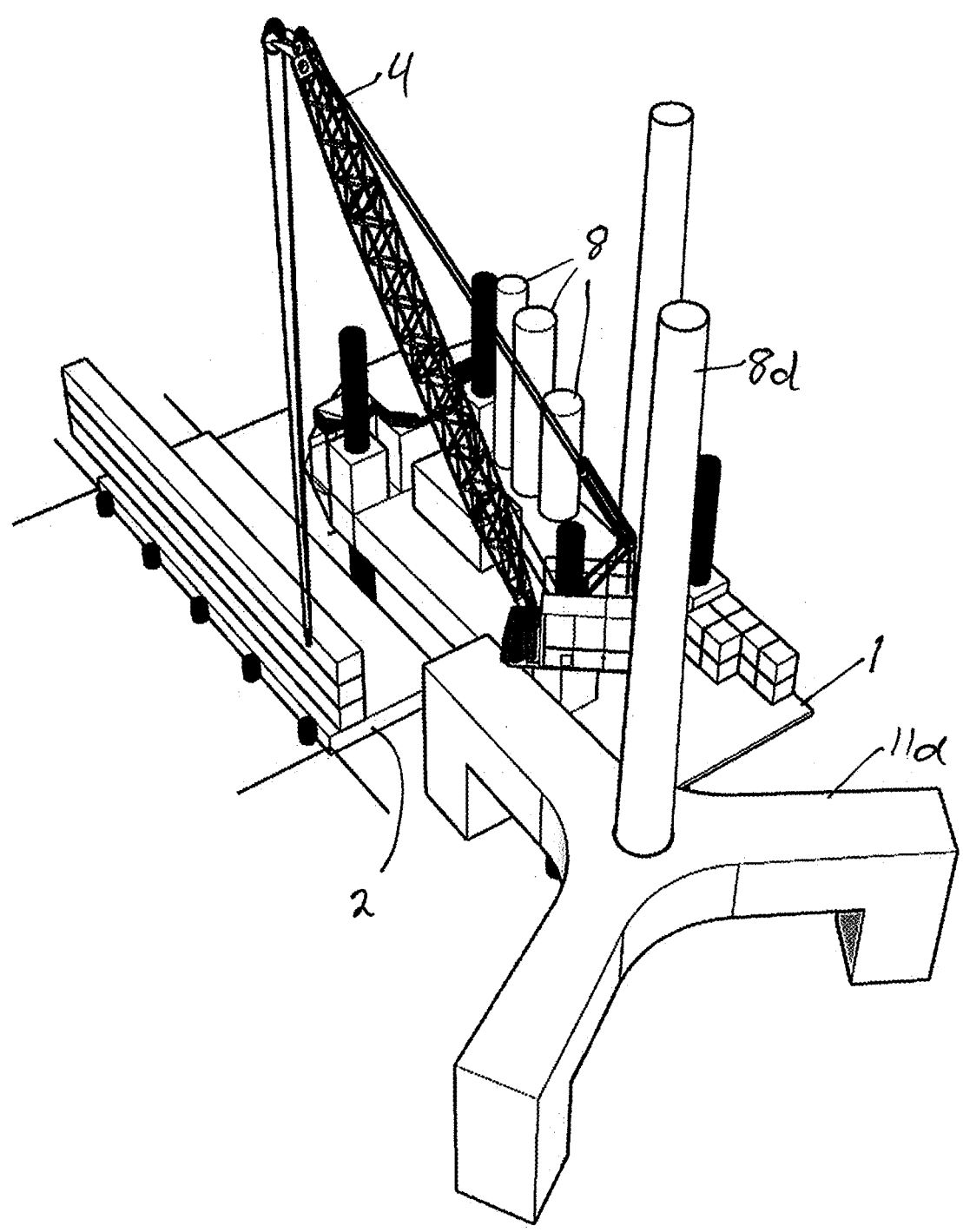
FIG. 18 shows a tower having been erected on a fourth foundation.

FIG. 18 shows a fourth foundation 11d with the fourth tower 8d affixed thereon.

Figure 19:
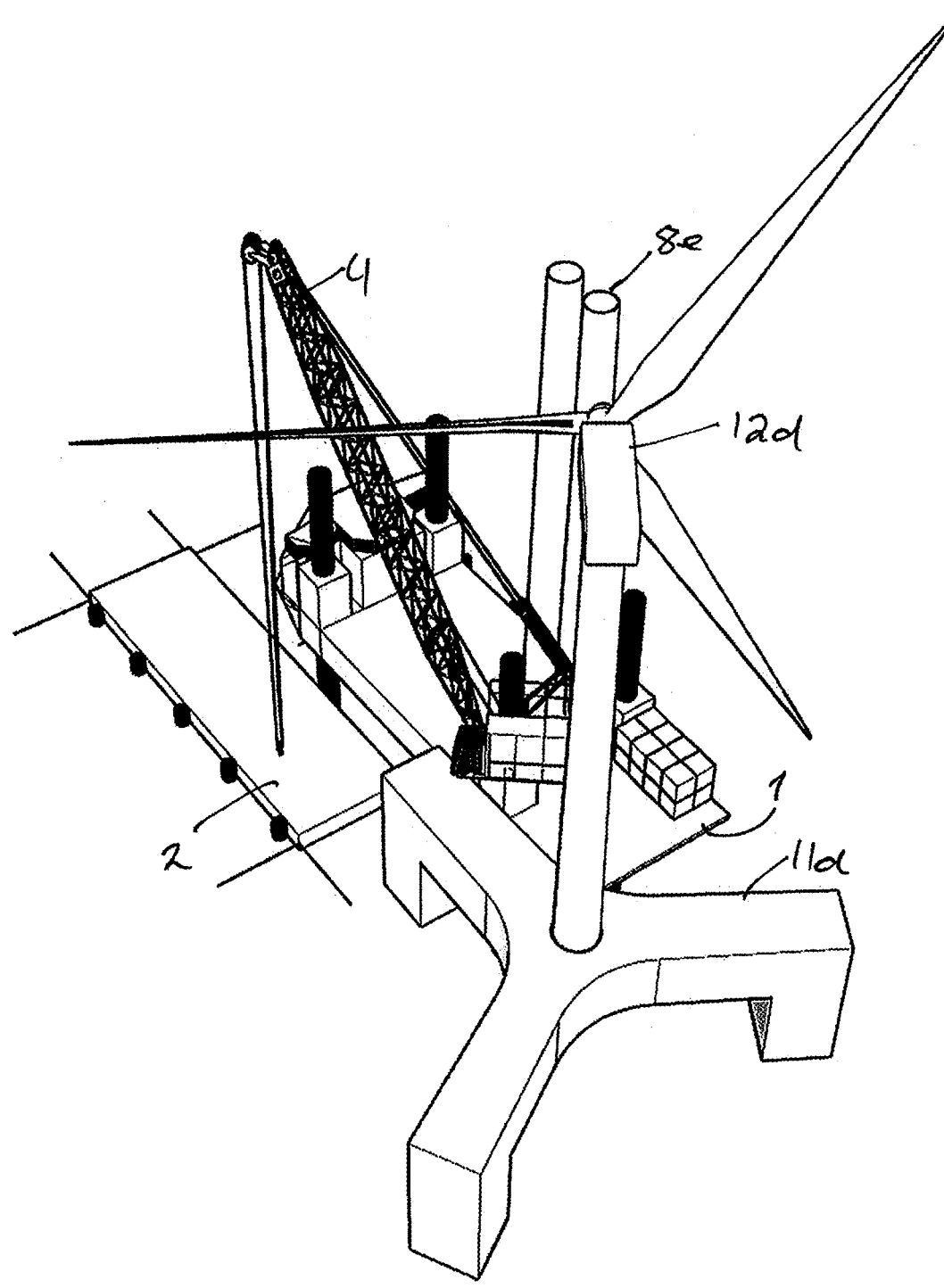
FIG. 19 shows the fourth wind turbine having been completed.

FIG. 19 shows the fourth turbine 12d completed. In idle periods the crane 4 has built up the fifth tower 8e from the remaining tower sections 8 (see FIG. 18).

Figure 20:
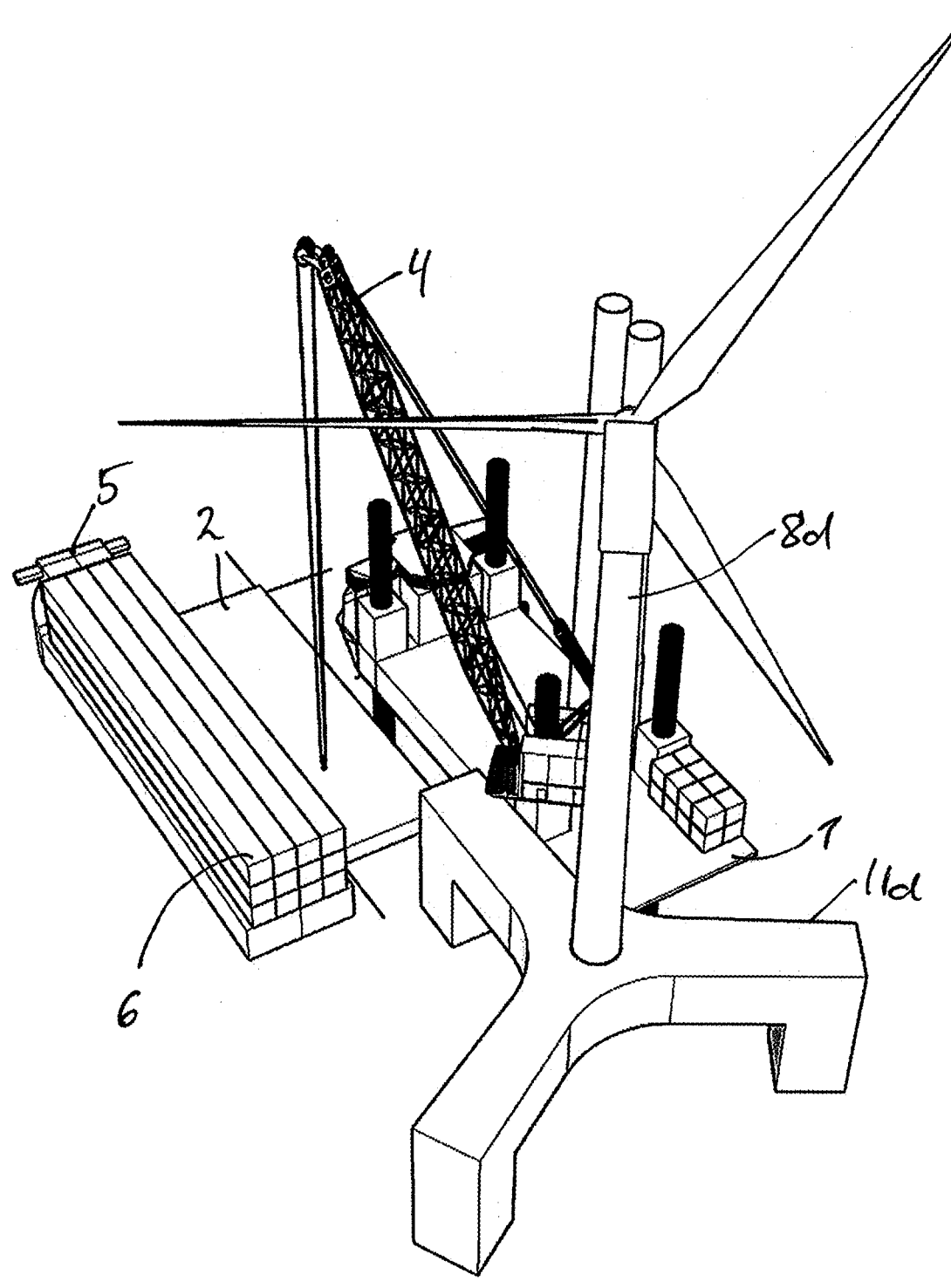
FIG. 20 shows the first feeder vessel coming back to the installation.

The barge 2 is now empty and the first feeder vessel 5 returns with new blades 6, as shown in FIG. 20. These are lifted onto the barge 2, while the empty blade cages are lifted from the installation vessel 1 to the first feeder vessel 5. The first feeder vessel then leaves. The fourth turbine 12d is now completed and will after testing be towed to the installation site or to an intermediate storage location.

Figure 21:
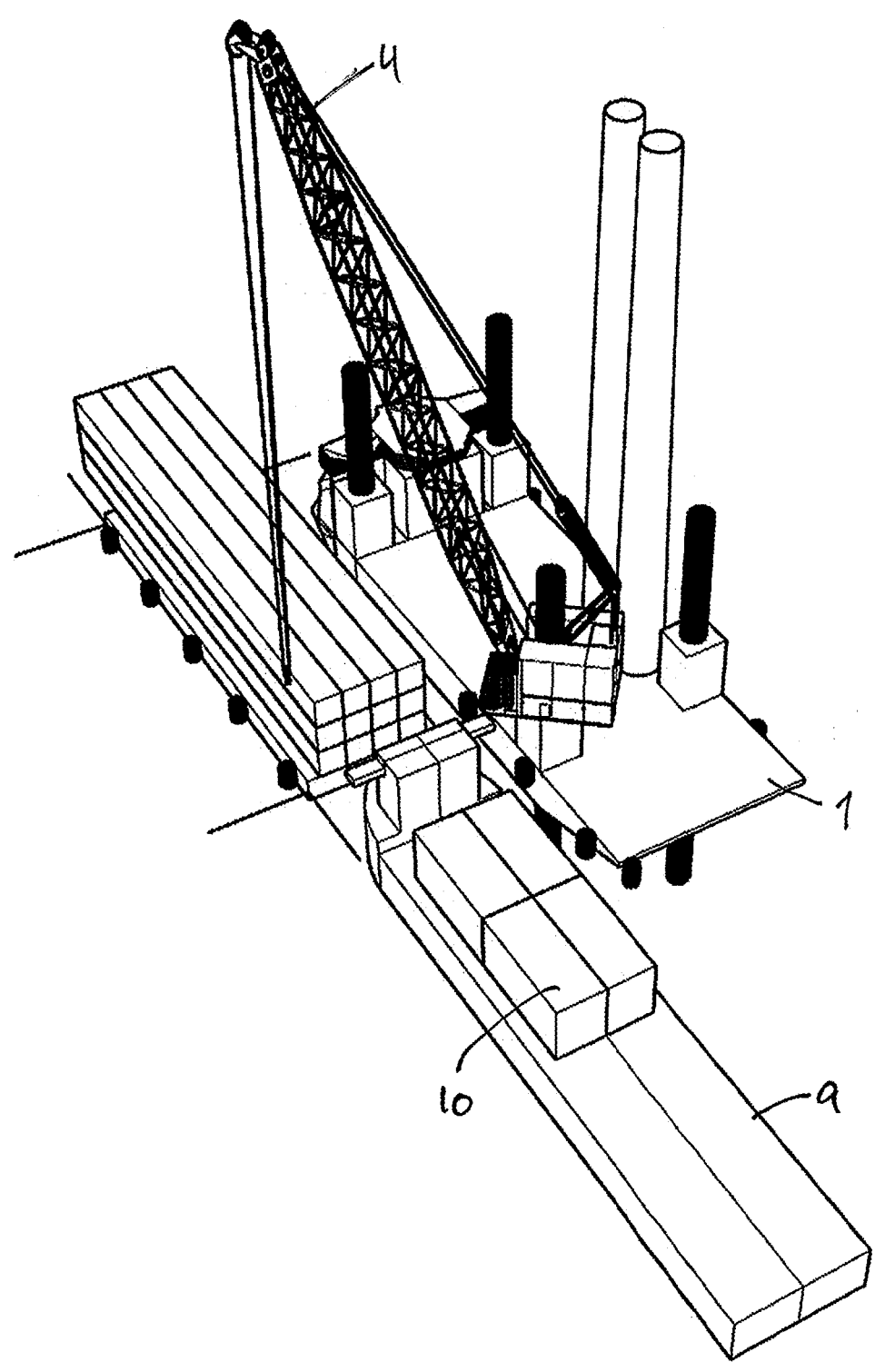
FIG. 21 shows the third feeder vessel coming back to the installation.
Figure 22:
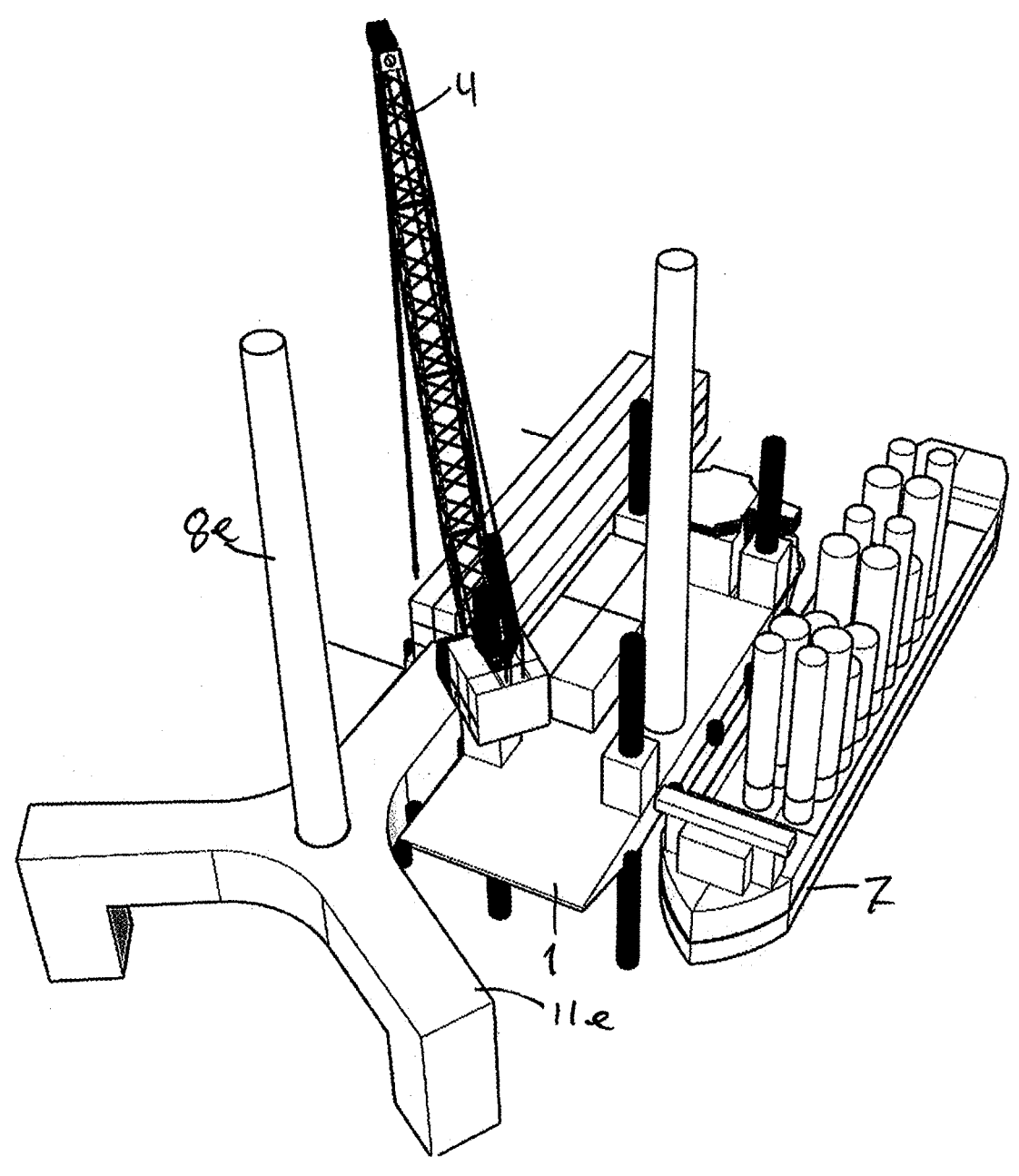
FIG. 22 shows the second feeder vessel coming back to the installation.
Figure 23:
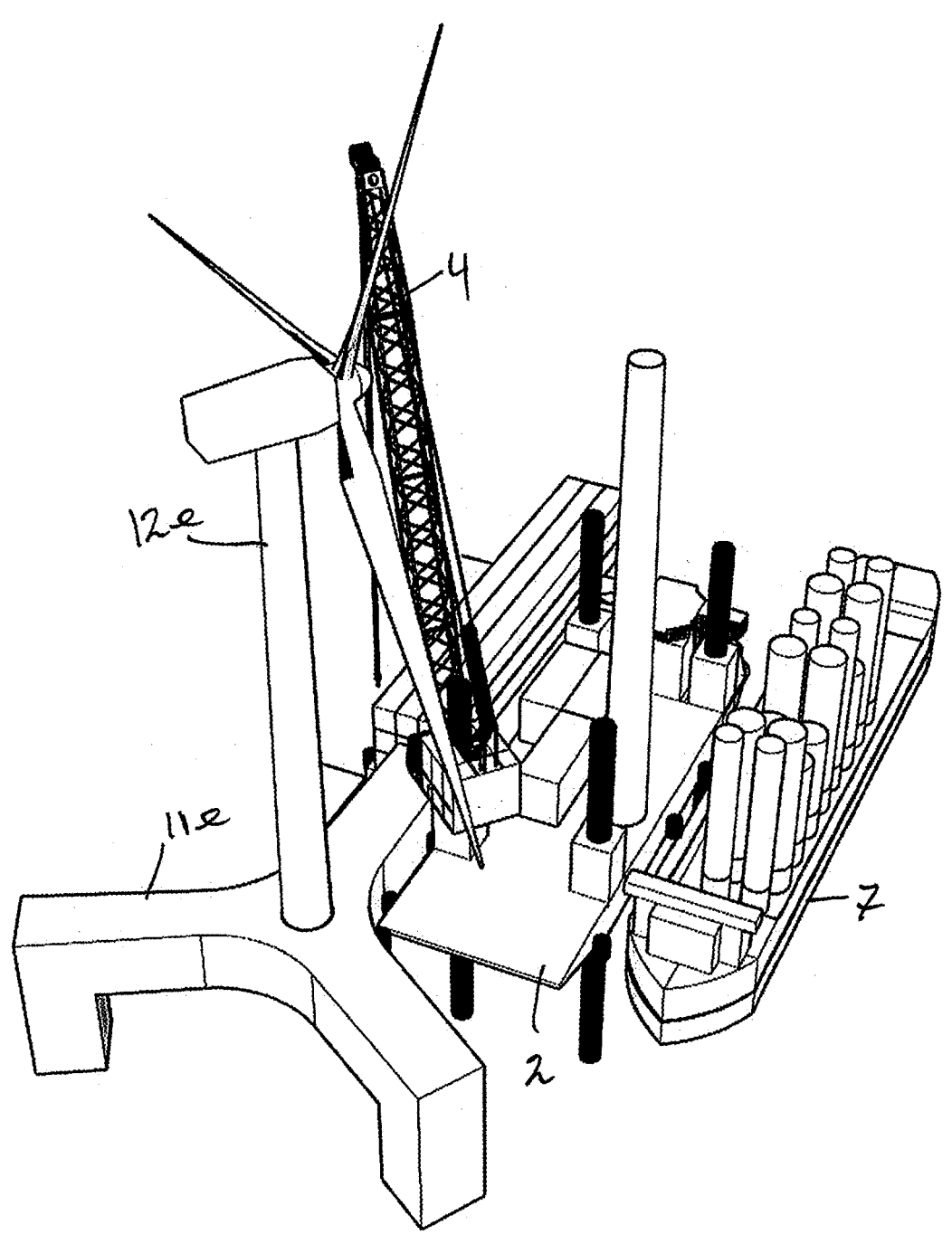
FIG. 23 shows a fifth wind turbine having been completed.

As shown in FIG. 21, the third feeder vessel 9 returns with new nacelles 10. These are lifted onto the installation vessel 1, as shown in FIG. 22. After this the third feeder vessel leaves.

A fifth foundation 11e is towed to and moored to the installation vessel 1 and the fifth tower 8e is lifted onto and affixed to the fifth foundation 11e. In the meantime, the second heavy lift feeder vessel 7 returns with new tower sections 8. Some of these are lifted onto the installation vessel 1 when the crane 4 is not busy assembling the fifth turbine 12e.

When the fifth turbine 12e has been tested and found to be in working order, it is towed away, and the process continues with additional foundations being towed to the position next to the installation vessel one by one. The assembly and installation of additional wind turbines proceeds in the same way as described above until the required number of complete wind turbines has been produced.

In the method described above, a crane vessel has been used, which does not have enough deck space for all tower section, so that some tower sections have to remain on board the second feeder vessel. With a somewhat larger crane vessel, it is of course possible to unload all of the tower sections from the feeder vessel and thereby free up the feeder vessel at an earlier time.

An important result of the present invention is that the installation facility does not have to wait for new parts to arrive but can continuously assemble wind turbines. The feeder vessels should therefore be freed of their load sufficiently early to be able to take another turn to the port and return with a new supply of parts in time for their need.

In the above example three feeder vessels are used. If the travel time between the port and the installation facility is short, two feeder vessels may be sufficient.

The invention claimed is:

1. A method for assembling a plurality of floating wind turbines, the method comprising:

establishing an installation facility by arranging an installation vessel, having a crane, at a secluded place, as well as mooring a barge next to the installation vessel;

transporting a plurality of turbine blades to the installation facility by a first feeder vessel;

lifting the turbine blades, using the crane, onto the installation facility;

transporting a plurality of tower sections to the installation facility by a second heavy lift feeder vessel;

lifting at least some of the plurality of tower sections, using the crane, onto the installation facility;

transporting a plurality of nacelles to the installation facility by a third feeder vessel;

lifting the nacelles, using the crane, onto the installation facility;

towing a first floating wind turbine foundation to the installation facility;

erecting a tower on the first floating wind turbine foundation by assembling a set of the tower sections, using the crane;

installing a nacelle on top of the tower, using the crane;

installing a set of turbine blades onto the nacelle, using the crane, to make a first completed wind turbine;

towing the first wind turbine away, making space for a second floating foundation at a spot where the first wind turbine was assembled;

wherein the turbine blades are transported in cages and are lifted onto the barge; and wherein, where the barge and a deck of the installation vessel do not have sufficient space, lifting at least one of the set of turbine blades onto the barge, lifting at least one of the plurality of tower sections onto the deck of the installation vessel, and lifting at least one of the plurality of nacelles onto the deck of the installation vessel, such that remaining ones of the set of turbine blades, remaining ones of the plurality of tower sections, and remaining ones of the plurality of nacelles, respectively, remain on the first feeder vessel, the second heavy lift feeder vessel, and the third feeder vessel.

2. The method of claim 1, wherein the installation vessel is a jack-up vessel and the arranging of the installation vessel comprises lifting the installation vessel from the sea surface using jack-up legs.

3. The method of claim 1, wherein the crane is used to erect a tower on the installation vessel when the crane is not busy assembling a wind turbine on the foundation.

* * * * *